US007669841B1

(12) United States Patent
Krasowski

(10) Patent No.: US 7,669,841 B1
(45) Date of Patent: Mar. 2, 2010

(54) SUPPORT BASE FOR CUTTING WOOD PLANKS AND THE LIKE

(76) Inventor: Karrison Krasowski, 37211 Jerome La., Murrieta, CA (US) 92562

( * ) Notice: Subject to any disclaimer, the term of this patent is extended or adjusted under 35 U.S.C. 154(b) by 755 days.

(21) Appl. No.: 11/605,624

(22) Filed: Nov. 28, 2006

Related U.S. Application Data

(60) Provisional application No. 60/739,766, filed on Nov. 28, 2005.

(51) Int. Cl.
*B23Q 3/00* (2006.01)

(52) U.S. Cl. ..................................................... 269/902

(58) Field of Classification Search .............. 144/286.1, 144/286.5, 287; 269/902, 289 R; 248/154, 248/500

See application file for complete search history.

(56) References Cited

U.S. PATENT DOCUMENTS

| | | | | |
|---|---|---|---|---|
| 4,465,268 | A | 8/1984 | Hudson | |
| 4,483,525 | A | 11/1984 | Thomas | |
| 4,566,559 | A | 1/1986 | Van Asten | |
| 4,924,843 | A | 5/1990 | Waren | |
| 5,472,180 | A * | 12/1995 | Bent | 269/99 |
| 6,659,440 | B2 | 12/2003 | Levy | |

* cited by examiner

*Primary Examiner*—Shelley Self

(57) ABSTRACT

A support brace includes a bottom section that has planar top and bottom surfaces. The bottom surface is seated on a ground surface, and the top surface abuts a bottom surface of a user foot. The bottom section has linear sides wherein one is diagonally offset from adjacent ones. A first wall extends upwardly from the bottom section. A second wall extends upwardly from the bottom section and has a longitudinal length registered perpendicularly to the first wall. The second wall has sloping top surfaces extending upwardly and away from the first wall that define a shoulder against which a wood plank is supported. A third wall abuts the bottom section and is spaced from the second wall for defining a passageway therebetween. The second wall has a lowest elevation defined above a highest elevation of the third wall.

18 Claims, 3 Drawing Sheets

SUPPORT BASE FOR CUTTING WOOD PLANKS AND THE LIKE

CROSS REFERENCE TO RELATED APPLICATIONS

This application claims the benefit of U.S. Provisional Application No. 60/739,766, filed Nov. 28, 2005.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to support braces and, more particularly, to a support brace for cutting wood planks and the like for use in stabilizing the wood plank by asserting a downward pressure on the support brace from a foot of a user during cutting conditions.

2. Prior Art

Everyday thousands of professional contractors and amateur do-it-yourselfers embark on a variety of construction and home improvement tasks such as building an addition onto the home, replacing paneling or flooring, and installing cupboards and countertops. Requiring varying degrees of skill, the careful use of tools and machinery, as well as a good eye, the results achieved by successfully completing these tasks can be enjoyed for years. There are certain tasks which can be difficult and time consuming to complete if working alone. Specifically, cutting planks of lumber unassisted can be extremely difficult, as keeping a plank of wood steady and stable when working alone can be an awkward endeavor.

Typically, when sawing lumber, a person must utilize a set of sawhorses or depend on the help of another in order to hold the wood steady. Unfortunately, using a set of sawhorses requires the carpenter to transport these devices to the work site, a sometimes arduous and inconvenient endeavor. Further, when using sawhorses, a carpenter still must utilize one hand to steady the limber and the other hand to saw it. If the wood is not carefully stabilized, accidents can happen, potentially damaging the lumber or resulting in injury to the user.

One prior art example shows a work-piece support assembly that includes an elongated work-piece support structure and a pair of support members pivotally connected to one another towards upper ends thereof. The support members are pivotally movable between an open position and a folded position. The work-piece support structure has a work-piece support surface constructed and arranged to support a portion of a work-piece. The work-piece support assembly further includes a tabletop assembly.

The tabletop assembly is movable into a deployed position in which the tabletop is disposed substantially horizontally in overlying relation to the work-piece support structure, with the pair of support members in their open operative position. The deployed tabletop presents an upper tabletop surface to support a work-piece. The tabletop assembly is movable, with the pair of support members in their open operative position, into a storage position which exposes the elongated work-piece support surface. Unfortunately, this prior art example is cumbersome and difficult to set up, as well as not conveniently transportable.

Another prior art example shows a sawing trestle for elongate wooden bodies comprises a single, upwardly extending frame part and two V-shaped members spaced apart by about ten centimeters. The two belts are provided for clamping the elongate bodies on the V-shaped members. The belts each have one end attachable to the frame part and a second end connected to a stretching member so that the belts can extend between ends of the V-shaped members and be stretched around the elongate bodies. Unfortunately, this prior art example requires the apparatus to be inserted into a ground surface and then suitably stabilized before engaging in cutting operations.

Accordingly, a need remains for a support brace for cutting wood planks and the like in order to overcome the above-noted shortcomings. The present invention satisfies such a need by providing an apparatus that is convenient and easy to use, is lightweight yet durable in design, and stabilizes the wood plank by asserting a downward pressure on the support brace from a foot of a user during cutting conditions. Such an apparatus effectively provides a user with a simple and efficient means of stabilizing planks of wood for measuring and cutting. The apparatus advantageously allows a user to keep both hands on a cutting tool while cutting through planks in a quick and easy manner. The apparatus effectively reduces the chance of accidental mishaps which can occur when using a saw with only one hand. The present invention effectively prevents the wood plank from wobbling or sliding, thus advantageously ensuring the work is completed in a neat and professional manner.

BRIEF SUMMARY OF THE INVENTION

In view of the foregoing background, it is therefore an object of the present invention to provide an apparatus for a support brace for cutting wood planks and the like. These and other objects, features, and advantages of the invention are provided by a support brace for cutting wood planks and the like for use in stabilizing the wood plank by asserting a downward pressure on the support brace from a foot of a user during cutting conditions.

The apparatus includes a bottom section that has planar top and bottom surfaces. Such a bottom surface is directly seated on a ground surface, and the top surface directly abuts a bottom surface of a user foot. The bottom section conveniently has a plurality of linear sides wherein one of the sides is diagonally offset from adjacent ones of the sides.

The apparatus further includes a first wall monolithically formed with the bottom section and advantageously extending upwardly therefrom. Such a first wall contiguously extends along an entire longitudinal length of a first one of the sides. The first wall has a linearly sloping top surface effectively extending upwardly towards the second wall (herein described below).

The apparatus further includes a second wall monolithically formed with the bottom section and advantageously extending upwardly therefrom that has a longitudinal length effectively registered perpendicularly to the first wall. Such a second wall contiguously extends along an entire longitudinal length of a second one of the sides. The second wall has a plurality of linearly sloping top surfaces advantageously extending upwardly and away from the first wall. Such top surfaces are advantageously staggered and effectively define a shoulder against which a wood plank is conveniently supported.

The apparatus further includes a third wall directly abutted with the bottom section and oppositely spaced from the second wall for effectively defining a passageway therebetween such that the user foot is removably positional in the passageway and effectively engaged with the second wall for advantageously prohibiting the user foot from extending beyond the second wall. Such a third wall contiguously extends along an entire longitudinal length of a third one of the sides.

The wood plank is removably positional on the second wall and effectively elevated above the user foot such that the user may conveniently cut a portion of the wood plank that terminates outside of the second wall while advantageously maintaining the user foot away from a cutting plane of the wood plank. The second wall has a lowest elevation effectively defined above a highest elevation of the third wall such that the wood plank advantageously remains safely above the user foot and the third wall during cutting operations. Fourth and fifth ones of the sides are conveniently open and advantageously unencumbered by the first, second and third walls.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

Figure 1:
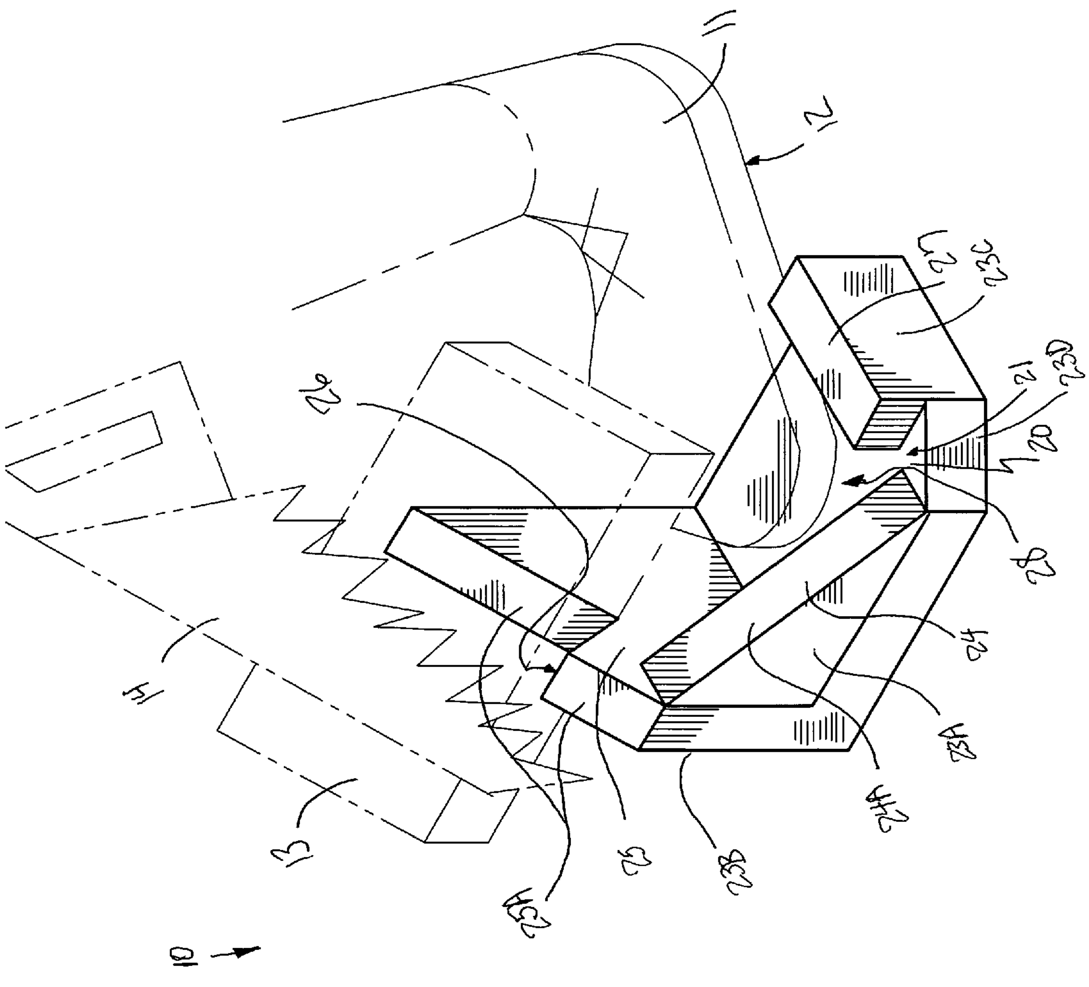
FIG. 1 is a front perspective view of a support brace for cutting wood planks and the like showing a wood plank supported by the apparatus, in accordance with the present invention.
Figure 3:
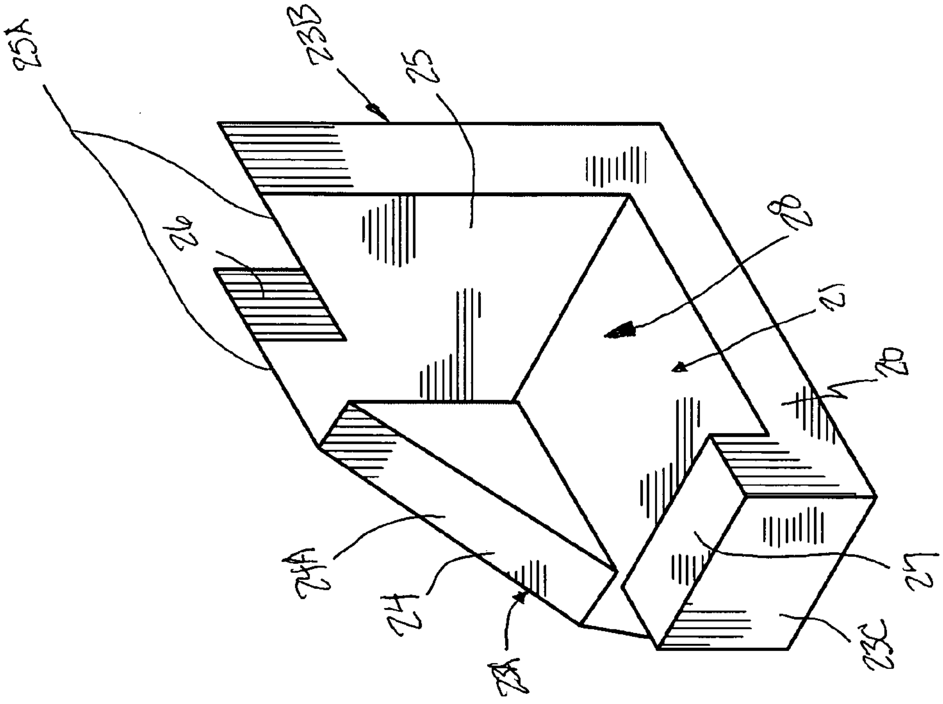
FIG. 3 is a rear perspective view of the apparatus shown in FIG. 2.
Figure 2:
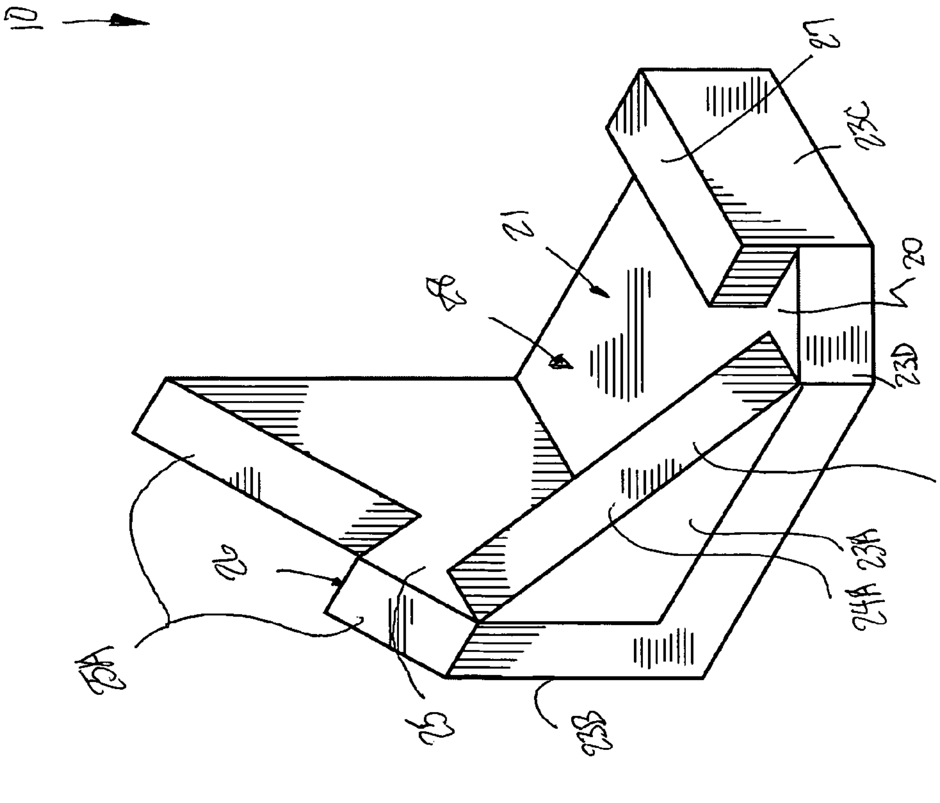
FIG. 2 is a front perspective view of the apparatus shown in FIG. 1 with the wood plank removed.
Figure 4:
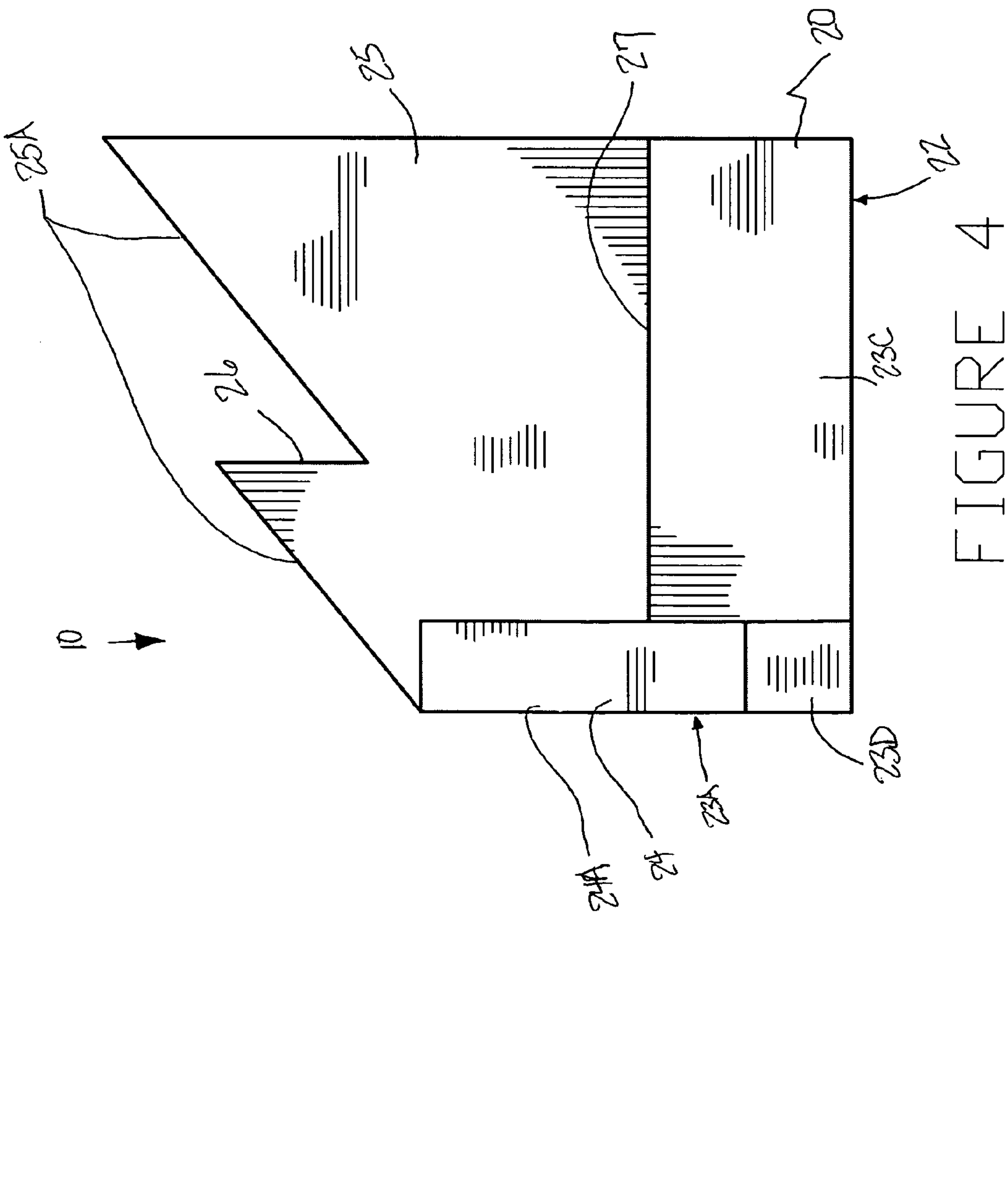
FIG. 4 is a side elevational view of the apparatus shown in FIG. 2.

The apparatus of this invention is referred to generally in FIGS. 1-4 by the reference numeral 10 and is intended to provide a support brace for cutting wood planks and the like. It should be understood that the apparatus 10 may be used to support many different types of objects to be cut and should not be limited in use to supporting only those types of objects described herein.

Referring initially to FIGS. 1, 2, 3 and 4, the apparatus 10 includes a bottom section 20 that has planar top 21 and bottom 22 surfaces. Of course, such a bottom section 20 can be produced in a variety of shapes and sizes, as is obvious to a person of ordinary skill in the art. Such a bottom surface 22 is directly seated on a ground surface, without the use of intervening elements, and the top surface 21 directly abuts a bottom surface 12 of a user foot 11, without the use of intervening elements. The bottom section 20 has a plurality of linear sides 23 wherein one of the sides 23D is diagonally offset from adjacent ones of the sides 23.

Again referring to FIGS. 1 through 4, the apparatus 10 further includes a first wall 24 monolithically formed with the bottom section 20 and advantageously extending upwardly therefrom. Such a first wall 24 contiguously extends along an entire longitudinal length of a first one 23A of the sides 23. The first wall 24 has a linearly sloping top surface 24A extending upwardly towards the second wall 25 (herein described below).

Yet again referring to FIGS. 1 through 4, the apparatus 10 further includes a second wall 25 monolithically formed with the bottom section 20 and advantageously extending upwardly therefrom that has a longitudinal length registered perpendicularly to the first wall 24. Such a second wall 25 contiguously extends along an entire longitudinal length of a second one 23B of the sides 23. The second wall 25 has a plurality of linearly sloping top surfaces 25A advantageously extending upwardly and away from the first wall 24. Such top surfaces 25A are advantageously staggered and define a shoulder 26, which is essential such that a wood plank 13 is supported thereagainst during cutting conditions.

Still referring to FIGS. 1 through 4, the apparatus 10 further includes a third wall 27 directly abutted with the bottom section 20, without the use of intervening elements, and oppositely spaced from the second wall 25 for defining a passageway 28 therebetween, which is critical such that the user foot 11 is removably positional in the passageway 28 and engaged with the second wall 25 for advantageously prohibiting the user foot 11 from extending beyond the second wall 25. Such a third wall 27 contiguously extends along an entire longitudinal length of a third one 23C of the sides 23.

The wood plank 13 is removably positional on the second wall 25 and elevated above the user foot 11, which is crucial such that the user may cut a portion of the wood plank 13 that terminates outside of the second wall 25 while advantageously maintaining the user foot 11 away from a cutting plane of the wood plank 13. The second wall 25 has a lowest elevation defined above a highest elevation of the third wall 27, which is vital such that the wood plank 13 advantageously remains safely above the user foot 11 and the third wall 27 respectively during cutting operations. Fourth and fifth ones of the sides 23 are open and advantageously unencumbered by the first, second and third walls 24, 25, 27, which is important for allowing a user to place a foot 11 within the passageway 28.

The small size of the apparatus 10 combined with the opportunity for a user to stabilize the apparatus 10 with a foot

11 provides the unexpected benefit of allowing a user to safely use a cutting tool 14 with both hands during cutting conditions, thereby overcoming prior art shortcomings. In addition, the elevation of the second wall 25 provides a safety barrier against a user inadvertently bringing a cutting tool 14 into contact with a user foot 11 and causing injury thereto during cutting conditions.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A support brace for cutting wood planks and the like for use in stabilizing the wood plank by asserting a downward pressure on the support brace from a foot of a user during cutting conditions, said support brace comprising:

- a bottom section having planar top and bottom surfaces, said bottom surface being directly seated on a ground surface, said top surface directly abutting a bottom surface of a user foot, said bottom section having a plurality of linear sides wherein one of said sides is diagonally offset from adjacent ones of said sides;
- a first wall monolithically formed with said bottom section and extending upwardly therefrom;
- a second wall monolithically formed with said bottom section and extending upwardly therefrom, said second wall having a longitudinal length registered perpendicularly to said first wall;
- a third wall directly abutted with said bottom section and oppositely spaced from said second wall for defining a passageway therebetween such that the user foot is removably positional in said passageway and engaged with said second wall for prohibiting the user foot from extending beyond said second wall, wherein the wood plank is removably positional on said second wall and elevated above the user foot such that the user may cut a portion of the wood plank that terminates outside of said second wall while maintaining the user foot away from a cutting plane of the wood plank.

2. The support brace of claim 1, wherein said first wall contiguously extends along an entire longitudinal length of a first one of said sides.

3. The support brace of claim 1, wherein said second wall contiguously extends along an entire longitudinal length of a second one of said sides.

4. The support brace of claim 1, wherein said third wall contiguously extends along an entire longitudinal length of a third one of said sides.

5. The support brace of claim 1, wherein fourth and fifth ones of said sides are open and unencumbered by said first, second and third walls.

6. The support brace of claim 1, wherein said first wall has a linearly sloping top surface extending upwardly towards said second wall.

7. A support brace for cutting wood planks and the like for use in stabilizing the wood plank by asserting a downward pressure on the support brace from a foot of a user during cutting conditions, said support brace comprising:

- a bottom section having planar top and bottom surfaces, said bottom surface being directly seated on a ground surface, said top surface directly abutting a bottom surface of a user foot, said bottom section having a plurality of linear sides wherein one of said sides is diagonally offset from adjacent ones of said sides;
- a first wall monolithically formed with said bottom section and extending upwardly therefrom;
- a second wall monolithically formed with said bottom section and extending upwardly therefrom, said second wall having a longitudinal length registered perpendicularly to said first wall, wherein said second wall has a plurality of linearly sloping top surfaces extending upwardly and away from said first wall, said top surfaces being staggered and defining a shoulder against which a wood plank is supported;
- a third wall directly abutted with said bottom section and oppositely spaced from said second wall for defining a passageway therebetween such that the user foot is removably positional in said passageway and engaged with said second wall for prohibiting the user foot from extending beyond said second wall, wherein the wood plank is removably positional on said second wall and elevated above the user foot such that the user may cut a portion of the wood plank that terminates outside of said second wall while maintaining the user foot away from a cutting plane of the wood plank.

8. The support brace of claim 7, wherein said first wall contiguously extends along an entire longitudinal length of a first one of said sides.

9. The support brace of claim 7, wherein said second wall contiguously extends along an entire longitudinal length of a second one of said sides.

10. The support brace of claim 7, wherein said third wall contiguously extends along an entire longitudinal length of a third one of said sides.

11. The support brace of claim 7, wherein fourth and fifth ones of said sides are open and unencumbered by said first, second and third walls.

12. The support brace of claim 7, wherein said first wall has a linearly sloping top surface extending upwardly towards said second wall.

13. A support brace for cutting wood planks and the like for use in stabilizing the wood plank by asserting a downward pressure on the support brace from a foot of a user during cutting conditions, said support brace comprising:

- a bottom section having planar top and bottom surfaces, said bottom surface being directly seated on a ground surface, said top surface directly abutting a bottom surface of a user foot, said bottom section having a plurality of linear sides wherein one of said sides is diagonally offset from adjacent ones of said sides;
- a first wall monolithically formed with said bottom section and extending upwardly therefrom;
- a second wall monolithically formed with said bottom section and extending upwardly therefrom, said second wall having a longitudinal length registered perpendicularly to said first wall, wherein said second wall has a plurality of linearly sloping top surfaces extending upwardly and away from said first wall, said top surfaces being staggered and defining a shoulder against which a wood plank is supported;
- a third wall directly abutted with said bottom section and oppositely spaced from said second wall for defining a passageway therebetween such that the user foot is removably positional in said passageway and engaged with said second wall for prohibiting the user foot from extending beyond said second wall, wherein the wood plank is removably positional on said second wall and elevated above the user foot such that the user may cut a portion of the wood plank that terminates outside of said second wall while maintaining the user foot away from a cutting plane of the wood plank, wherein said second wall has a lowest elevation defined above a highest elevation of said third wall such that the wood plank remains safely above the user foot and said third wall during cutting operations.

14. The support brace of claim 13, wherein said first wall contiguously extends along an entire longitudinal length of a first one of said sides.

15. The support brace of claim 13, wherein said second wall contiguously extends along an entire longitudinal length of a second one of said sides.

16. The support brace of claim 13, wherein said third wall contiguously extends along an entire longitudinal length of a third one of said sides.

17. The support brace of claim 13, wherein fourth and fifth ones of said sides are open and unencumbered by said first, second and third walls.

18. The support brace of claim 13, wherein said first wall has a linearly sloping top surface extending upwardly towards said second wall.

* * * * *